US012331791B2

(12) United States Patent
Chon et al.

(10) Patent No.: US 12,331,791 B2
(45) Date of Patent: Jun. 17, 2025

(54) CLUTCH ADJUSTMENT DEVICE OF AGRICULTURAL WORK VEHICLE

(71) Applicant: LS MTRON LTD., Anyang-si (KR)

(72) Inventors: Hyo Jong Chon, Anyang-si (KR); Jung Min Kim, Anyang-si (KR)

(73) Assignee: LS MTRON LTD., Anyang-si (KR)

( * ) Notice: Subject to any disclaimer, the term of this patent is extended or adjusted under 35 U.S.C. 154(b) by 84 days.

(21) Appl. No.: 18/287,717

(22) PCT Filed: Apr. 22, 2022

(86) PCT No.: PCT/KR2022/005774
§ 371 (c)(1),
(2) Date: Oct. 20, 2023

(87) PCT Pub. No.: WO2022/225362
PCT Pub. Date: Oct. 27, 2022

(65) Prior Publication Data
US 2024/0360878 A1    Oct. 31, 2024

(30) Foreign Application Priority Data

Apr. 23, 2021  (KR) ........................ 10-2021-0053199
Apr. 19, 2022  (KR) ........................ 10-2022-0048258

(51) Int. Cl.
*F16D 23/12*    (2006.01)
*A01B 76/00*   (2006.01)

(52) U.S. Cl.
CPC .............. *F16D 23/12* (2013.01); *A01B 76/00* (2013.01); *F16D 2023/126* (2013.01)

(58) Field of Classification Search
CPC ........................... F16D 23/12; F16D 2023/141
See application file for complete search history.

(56) References Cited

U.S. PATENT DOCUMENTS

| 4,266,649 A | 5/1981 | Falzoni |
| 6,171,313 B1 * | 1/2001 | Razdolsky ........... A61B 17/666 |
| | | 606/86 R |

(Continued)

FOREIGN PATENT DOCUMENTS

| CN | 111779772 A | * 10/2020 |
| KR | 19980017632 U | * 7/1998 |

(Continued)

OTHER PUBLICATIONS

International Search Report for related International Application No. PCT/KR2022/005774; action dated Oct. 27, 2022; (2 pages).

(Continued)

*Primary Examiner* — Stacey A Fluhart
(74) *Attorney, Agent, or Firm* — K&L Gates LLP

(57) ABSTRACT

The present disclosure is directed to a clutch adjustment device for an agricultural work vehicle, the clutch adjustment device including: a clutch configured to selectively connect and disconnect the power transmission of an engine and a transmission; a clutch link part connected to the clutch, and configured to manipulate the engagement and disengagement of the clutch; an operation link part coupled to the clutch link part; and an adjustment part configured to detachably couple the operation link part to the clutch link part so that the relative position of the operation link part with respect to the clutch link part can be adjusted; wherein the clutch link part includes a plurality of clutch adjustment holes; wherein the operation link part includes a plurality of operation adjustment holes; and wherein the adjustment part adjusts the relative position of the operation link part with respect to the clutch link part.

11 Claims, 11 Drawing Sheets

(56) References Cited

U.S. PATENT DOCUMENTS

2005/0230209 A1* 10/2005 Duignan ................ B62K 23/08
                                                                    192/3.51
2021/0070383 A1    3/2021 Cheong et al.

FOREIGN PATENT DOCUMENTS

| KR | 1020110093645 A | 8/2011 | | |
|---|---|---|---|---|
| KR | 1020110127654 A | 11/2011 | | |
| KR | 102129357 B1 | 7/2020 | | |
| KR | 20200081596 A | 7/2020 | | |
| WO | WO-2015007282 A2 * | 1/2015 | ............. | F16D 23/12 |
| WO | 2022225362 A1 | 10/2022 | | |

OTHER PUBLICATIONS

Written Opinion for related International Application No. PCT/KR2022/005774; action dated Oct. 27, 2022; (4 pages).

* cited by examiner

I-I

II-II

CLUTCH ADJUSTMENT DEVICE OF AGRICULTURAL WORK VEHICLE

CROSS-REFERENCE TO RELATED APPLICATION

This application is a National Stage of International Application No. PCT/KR2022/005774 filed on Apr. 22, 2022, which claims priority to and the benefit of Korean Patent Application No. 10-2021-0053199, filed on Apr. 23, 2021, and Korean Patent Application No. 10-2022-0048258, filed on Apr. 19, 2022, the disclosures of which are incorporated herein by reference in its entirety.

FIELD

The present disclosure relates to an agricultural work vehicle that is used to grow crops required for human life by using land.

BACKGROUND

Agricultural work vehicles are used to grow crops required for human life by using land. For example, combines, tractors, rice transplanters, etc. correspond to agricultural work vehicles. Combines are used to cut and thresh crops such as rice, barley, wheat, soybeans, etc. Tractors perform the work required to grow crops by using traction force. Rice transplanters perform the work of transplanting seedlings, grown in seedbeds or seedling boxes, into rice fields.

Such agricultural work vehicles need to adjust torque, speed, etc. during work processes. To this end, agricultural work vehicles include transmission devices.

Such a transmission device includes a clutch that selectively transmits driving. The clutch transmits the driving, transmitted from an engine or a previous transmission part, to an axle or a subsequent transmission part. When a driver does not step on a clutch pedal provided in a driver's seat, the clutch transmits the driving, transmitted from the engine or the previous transmission part, to the axle or the subsequent transmission part. In this case, the clutch is in the state of being engaged. When the driver steps on the clutch pedal with his or her foot, the clutch does not transmit the driving, transmitted from the engine or the previous transmission part, to the axle or the subsequent transmission part. In this case, the clutch is in the state of being disengaged. The driving of the clutch may be electronically performed, in which case the clutch may be selectively engaged and disengaged through a separate clutch operation switch.

Furthermore, an agricultural work vehicle may be implemented such that a clutch plate and a disk plate disposed in the clutch selectively come into contact with each other and are spaced apart from each other by an operation link part driven by an operator. When the operation link part is rotated in one direction by a driver, the clutch plate and the disk plate may come into contact with each other. In this case, the clutch is in the state of being engaged. In contrast, when the operation link part is rotated in the opposite direction by the driver, the clutch plate and the disk plate may be spaced apart from each other. In this case, the clutch is in the state of being disengaged.

In the agricultural work vehicle according to the prior art, the clutch plate and the disk plate may be worn due to friction in the process of bringing the clutch plate and the disk plate into contact with each other or separating the clutch plate and the disk plate from each other by an operator. In this case, a spaced space is generated between the clutch plate and the disk plate. That is, excessive free play is generated in the clutch. Accordingly, the operation link part is further rotated in one direction to bring the clutch plate and the disk plate into contact with each other. Therefore, an error corresponding to the amount of rotation of the operation link part occurs. As the operation link part is rotated, the clutch is not engaged or disengaged smoothly, resulting in a problem in which the clutch does not operate normally.

SUMMARY

The present disclosure has been conceived to overcome the above-described problems, and is intended to provide an agricultural work vehicle that can overcome the erroneous operation of a clutch resulting from excessive free play that is generated in the clutch.

In order to solve the above problem, the present disclosure may include the following configuration:

A clutch adjustment device for an agricultural work vehicle may include: a clutch configured to selectively connect and disconnect the power transmission of the engine and transmission of an agricultural work vehicle; a clutch link part connected to the clutch, and configured to manipulate the engagement and disengagement of the clutch and rotate around a connection shaft during the engagement and disengagement of the clutch; an operation link part coupled to the clutch link part to rotate together with the clutch link part around the connection shaft; and an adjustment part configured to detachably couple the operation link part to the clutch link part so that the relative position of the operation link part with respect to the clutch link part can be adjusted around the connection shaft. The clutch link part may include a plurality of clutch adjustment holes arranged to be spaced apart from each other. The operation link part may include a plurality of operation adjustment holes arranged to be spaced apart from each other. The adjustment part may be inserted into one of the clutch adjustment holes and one of the operation adjustment holes and adjust the relative position of the operation link part with respect to the clutch link part around the connection shaft.

According to the present disclosure, the following effects may be achieved.

The present disclosure is implemented to prevent the erroneous operation of the clutch resulting from the excessive free play generated in the clutch by adjusting the relative position of the operation link part with respect to the clutch link part. Accordingly, the present disclosure may improve the efficiency of clutch repair work by repairing the clutch by relatively simply adjusting the position of the operation link part without adjusting the operation part that is difficult to precisely adjust.

The present disclosure is implemented such that the clutch is made to operate normally by adjusting the operation link part without replacing parts of the clutch when excessive free play is generated in the clutch, so that the service life of the clutch can be extended.

DETAILED DESCRIPTION

Figure 1:
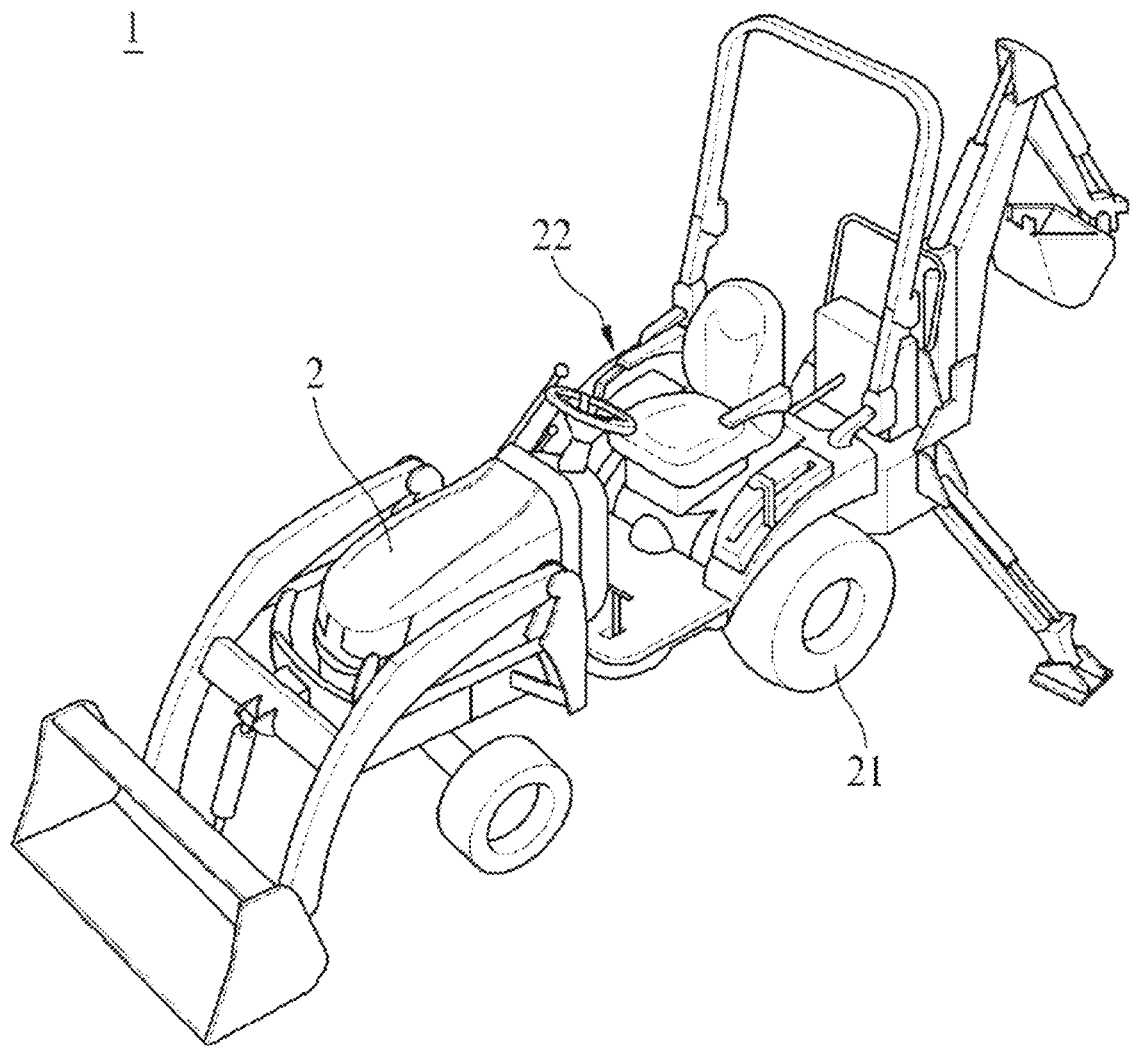
FIG. 1 is a schematic perspective view of an agricultural work vehicle.

Embodiments of a clutch adjustment device for an agricultural work vehicle according to the present disclosure will be described in detail with reference to the accompanying drawings.

Referring to FIGS. 1 to 5, an agricultural work vehicle 1 according to the present disclosure is used to grow crops required for human life by using land. For example, the agricultural work vehicle 1 may be a tractor, a combine, a rice transplanter, or the like.

This disclosure includes: a clutch 31 configured to selectively connect and disconnect the power transmission of the engine (not shown) and transmission 3 of the agricultural work vehicle 1; a clutch link part 5 connected to the clutch 31, and configured to manipulate the engagement and disengagement of the clutch 31 and rotate around a connection shaft 5a during the engagement and disengagement of the clutch 31; an operation link part 6 coupled to the clutch link part 5 to rotate together with the clutch link part 5 around the connection shaft 5a; an operation part 7 configured to rotate the operation link part 6 to rotate the clutch link part 5 around the connection shaft 5a; and an adjustment part 8 configured to detachably couple the operation link part 6 to the clutch link part 5 so that the relative position of the operation link part 6 with respect to the clutch link part 5 is adjusted around the connection shaft 5a. In this case, the clutch link part 5 includes a plurality of clutch adjustment holes 52 arranged to be spaced apart from each other. The operation link part 6 includes a plurality of operation adjustment holes 61 arranged to be spaced apart from each other. The adjustment part 8 and the operation link part 6 may be inserted into one of the clutch adjustment holes 52 and one of the operation adjustment holes 61 and adjust the relative position of the operation link part 6 with respect to the clutch link part 5 around the connection shaft 5a.

Accordingly, a clutch adjustment device 10 for an agricultural work vehicle according to the present disclosure may achieve the following effects.

The clutch adjustment device 10 for an agricultural work vehicle according to the present disclosure is implemented to adjust the relative position of the operation link part 6 with respect to the clutch link part 5 through the clutch adjustment holes 52 and the operation adjustment holes 61. Accordingly, the clutch adjustment device 10 for an agricultural work vehicle according to the present disclosure may prevent the erroneous operation of the clutch 31 by adjusting the position of the operation link part 6 without adjusting the operation part 7, which is difficult to finely adjust.

Furthermore, the clutch adjustment device 10 for an agricultural work vehicle according to the present disclosure is implemented such that the clutch 31 is normally operated by adjusting the operation link part 6 without replacing parts of the clutch 31 when excessive free play is generated in the clutch 31, so that the service life of the clutch 31 can be extended.

The vehicle body 2, the transmission 3, the manipulation part 4, the clutch link part 5, the operation link part 6, the operation part 7, and the adjustment part 8 will be described more specifically with reference to the accompanying drawings.

Figure 2:
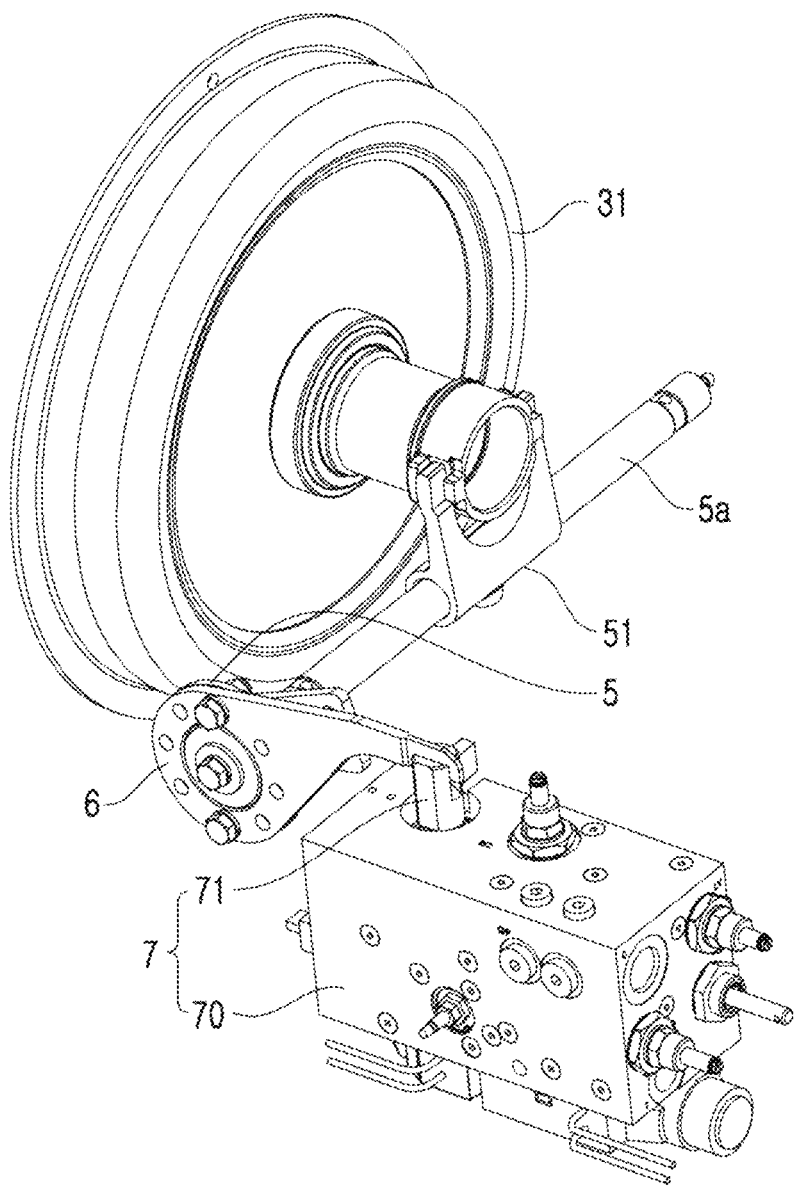
FIG. 2 is a schematic perspective view showing a part of the agricultural work vehicle.
Figure 3:
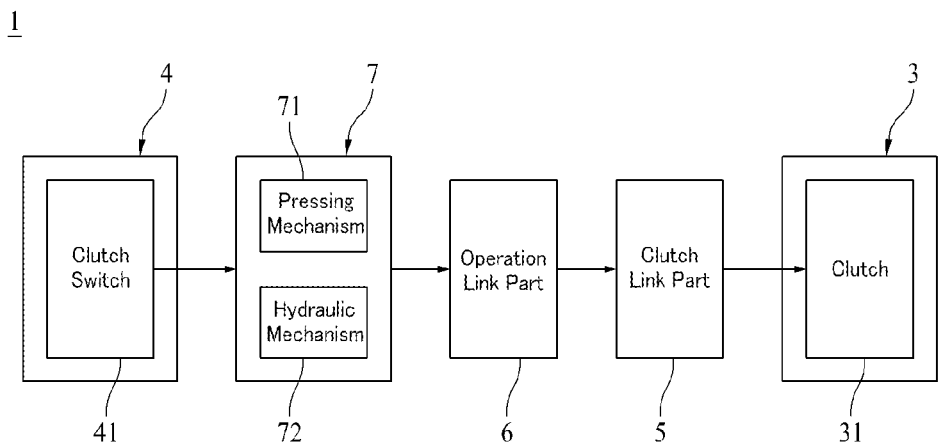
FIG. 3 is a schematic block diagram of the agricultural work vehicle.
Figure 4:
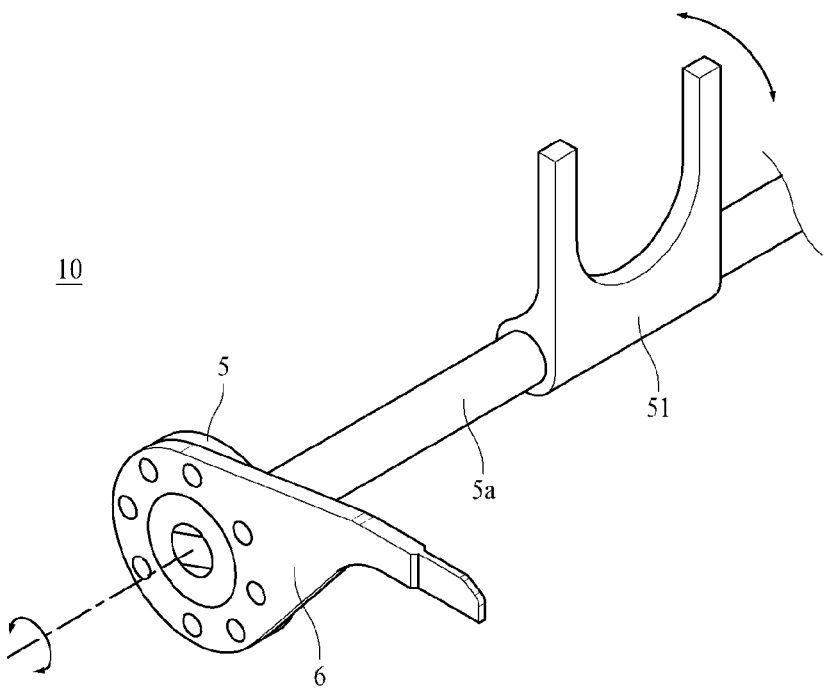
FIG. 4 is a schematic perspective view of a clutch adjustment device for an agricultural work vehicle according to the present disclosure.

Referring to FIGS. 1 to 3, the vehicle body 2 supports the engine. The engine, the transmission 3, the manipulation part 4, the clutch link part 5, the operation link part 6, the operation part 7, and the adjustment part 8 may be coupled to the vehicle body 2. The vehicle body 2 is provided with a driver's seat 21 configured to allow a driver to sit thereon. Wheels 22 may be coupled to the vehicle body 2. When the driving generated by the engine is transmitted to the wheels 22 through the transmission 3, the vehicle body 2 may travel in a driving direction as the wheels 22 rotate.

Referring to FIGS. 1 to 3, the transmission 3 performs shifting on the driving transmitted from the engine. As the transmission 3 performs shifting, the traveling speed at which the vehicle body 2 travels may be changed. The transmission 3 may include the clutch 31.

The clutch 31 selectively transmits driving. The clutch 31 may selectively transmit the driving, transmitted from the engine, to at least one of transmission mechanisms (not shown) included in the transmission 3. The clutch 31 may be implemented as a dry clutch. The clutch 31 may also be implemented as a dry single-plate clutch.

Referring to FIGS. 1 to 3, the manipulation part 4 is intended to control the transmission 3. The manipulation part 4 may be placed on the driver's seat 21. Accordingly, a driver may control the transmission 3 by sitting on the driver's seat 21 and then operating the manipulation part 4. The manipulation part 4 may include a clutch switch 41.

The clutch switch 41 is used to control the clutch 31 through manipulation by the driver's hand. When the driver presses the clutch switch 41 with his or her hand, the clutch switch 41 operates the operation part 7 and thus operates the operation link part 6. Depending on whether the driver presses the clutch switch 41, the clutch switch 41 may operate the operation part 7 differently. The clutch switch 41 may operate the operation part 7 using an electric signal. The clutch switch 41 may operate the operation part 7 through hydraulic pressure using a working fluid, cooperative operation via a link member, or the like. Although the present embodiment has been described as an embodiment in which the operation part 7 is composed of a hydraulic actuator, the present disclosure is not limited to this configuration. A configuration in which a general clutch pedal linkage is directly connected to the operation link part 6 may also be applied.

Referring to FIGS. 1 to 5, the clutch link part 5 may manipulate the engagement and disengagement of the clutch 31. The clutch link part 5 may be coupled to the vehicle body 2. The clutch link part 5 may include the connection shaft 5a. The clutch link part 5 may be coupled to the vehicle body 2 so that it can be coupled to the connection shaft 5a and rotated about the connection shaft 5a. The clutch link part 5 may be connected to each of the clutch 31 and the operation link part 6. Accordingly, the clutch link part may allow the clutch 31 to be engaged or disengaged while rotating around the connection shaft 5a. When the clutch switch 41 is manipulated, the clutch link part 5 may be operated by the operation link part 6 operating in conjunction with the operation part 7 and allow the clutch 31 to be engaged or disengaged. Hereinafter, the rotation of the clutch link part 5 refer to rotation around the connection shaft 5a unless otherwise specified.

The clutch link part 5 may be implemented to allow the clutch 31 to be engaged or disengaged through a clutch operation member 51. The clutch operation member 51 may be coupled to the clutch link part 5 to rotate together with the clutch link part 5. The clutch operation member 51 may be coupled to the clutch link part 5. The clutch operation member 51 may be coupled to the connection shaft 5a. The clutch operation member 51 may be formed to protrude from the clutch link part 5. Depending on the direction in which the clutch link part 5 is rotated, the clutch operation member 51 may provide pressing force to the clutch 31 or release pressing force. Accordingly, the clutch operation member may allow the clutch 31 to be selectively engaged and disengaged.

Referring to FIGS. 1 to 5 and 12, the operation link part 6 may be coupled to the clutch link part 5 to rotate together with the clutch link part 5. The operation link part 6 and the clutch link part 5 may be coupled by the adjustment part 8. The operation link part 6 may be coupled to the clutch link part 5 and rotate together with the clutch link part 5 around the connection shaft 5a. When the clutch switch 41 is manipulated, the operation link part 6 may rotate the clutch link part 5 while being rotated by the operation part 7.

For example, when the driver presses the clutch switch 41 with his or her hand, the operation part 7 may be operated such that the operation link part 6 rotates counterclockwise CCW. In this case, the operation link part 6 may rotate the clutch link part 5 and the clutch operation member 51 counterclockwise CCW while rotating counterclockwise CCW. The clutch operation member 51 may provide pressing force to the clutch 31 while rotating counterclockwise CCW. Accordingly, in the clutch adjustment device 10 for an agricultural work vehicle according to the present disclosure, the clutch 31 may be disengaged.

For example, when the driver releases his/her hand from the clutch switch 41, the force with which the operation part 7 rotates the operation link part 6 counterclockwise CCW is released. The clutch operation member 51 may be rotated clockwise CW by the restoring force generated by the clutch 31 itself. Accordingly, the clutch link part 5 may be rotated clockwise CW together with the operation link part 6. Therefore, in the clutch adjustment device 10 for an agricultural work vehicle according to the present disclosure, the clutch 31 may be engaged.

Referring to FIG. 3, the operation part 7 may include a pressing mechanism 71 and a hydraulic mechanism 72.

The pressing mechanism 71 is selectively raised and lowered depending on whether the clutch switch 41 is manipulated. As the pressing mechanism 71 is raised or lowered, the operation link part 6 may be rotated. Accordingly, the clutch link part 5 may be rotated together with the operation link part 6. The pressing mechanism 71 may be coupled to an operation body 70 so that it can be selectively raised and lowered. The operation body 70 is coupled to the vehicle body 2. The operation body 70 may be disposed below the operation link part 6.

The hydraulic mechanism 72 selectively raises and lowers the pressing mechanism 71 using a working fluid. The working fluid may be oil. The hydraulic mechanism 72 may raise the pressing mechanism 71 toward the side on which the operation link part 6 is disposed by supplying a working fluid toward the pressing mechanism 71. In contrast, the hydraulic mechanism 72 may lower the pressing mechanism 71 to the side opposite the side on which the operation link part 6 is disposed by discharging a working fluid toward the pressing mechanism 71. In this case, the hydraulic mechanism 72 may be operated depending on whether the clutch switch 41 is operated by using an electric signal, hydraulic pressure using a working fluid, cooperative operation via a link member, or the like. The operation part 7 may be implemented as an actuator.

The hydraulic mechanism 72 may be coupled to the operation body 70. In this case, the operation body 70 may include a raising depression (not shown) into which the pressing mechanism 71 is coupled so that it can be selectively raised and lowered, and an installation depression (not shown) into which the hydraulic mechanism 72 is coupled. All or part of the raising depression may be used as a hydraulic chamber for the working fluid supplied by the hydraulic mechanism 72. In this case, the operation body 70 may include a communication hole (not shown) configured to connect the hydraulic chamber and the hydraulic mechanism 72 so that they can communicate with each other. The hydraulic mechanism 72 may selectively raise and lower the pressurizing mechanism 71 by supplying the working fluid to the hydraulic chamber through the communication hole or discharging the working fluid from the hydraulic chamber. Accordingly, the clutch adjustment device 10 for an agricultural work vehicle according to the present disclosure may modularize the pressing mechanism 71 and the hydraulic mechanism 72 using the operation body 70, and may also be implemented such that the hydraulic mechanism 72 can selectively raise and lower the pressing mechanism 71 by means of hydraulic pressure without an external pipe by using the communication hole.

Although the present embodiment has been described as an embodiment in which the operation part 7 is composed of a hydraulic actuator, the present disclosure is not limited to this configuration. A configuration in which a general clutch pedal linkage is directly connected to the operation link part 6 may also be applied.

Figure 5:
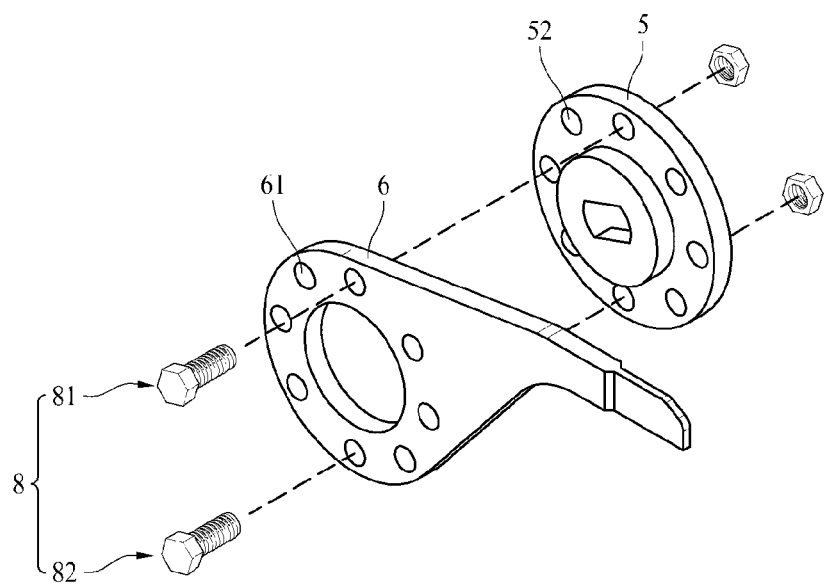
FIG. 5 is a schematic exploded perspective view showing a clutch link part, an operation link part, and an adjustment part in the clutch adjustment device for an agricultural work vehicle according to the present disclosure.
Figure 6:
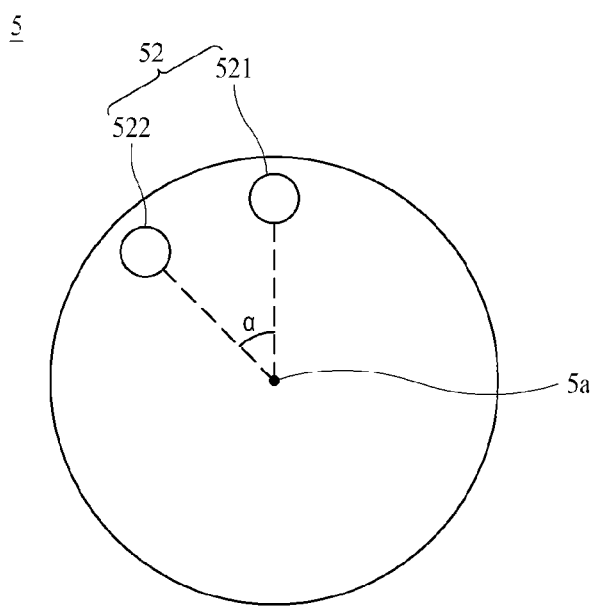
FIG. 6 is a schematic plan view showing the arrangement relationship between a reference clutch adjustment hole and spaced clutch adjustment holes in the clutch adjustment device for an agricultural work vehicle according to the present disclosure.
Figure 7:
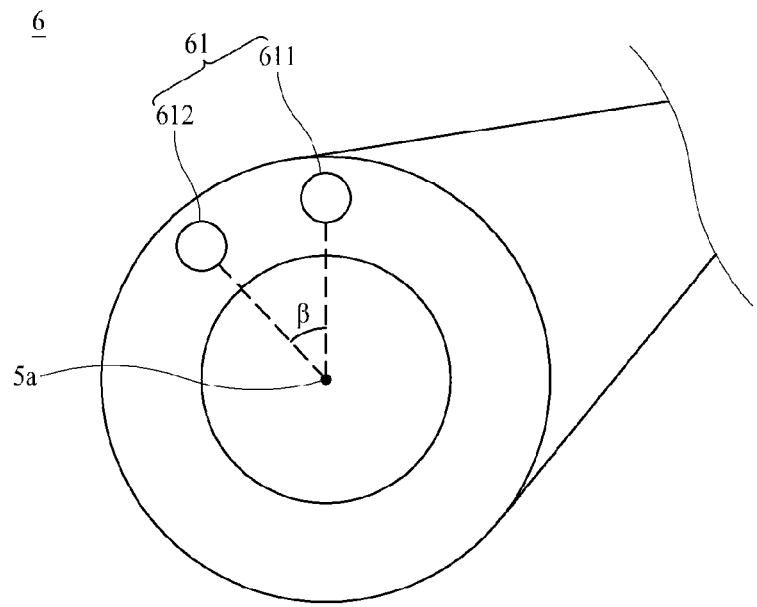
FIG. 7 is a schematic plan view showing the arrangement relationship between a reference operation adjustment hole and spaced operation adjustment holes in the clutch adjustment device for an agricultural work vehicle according to the present disclosure.
Figure 8:
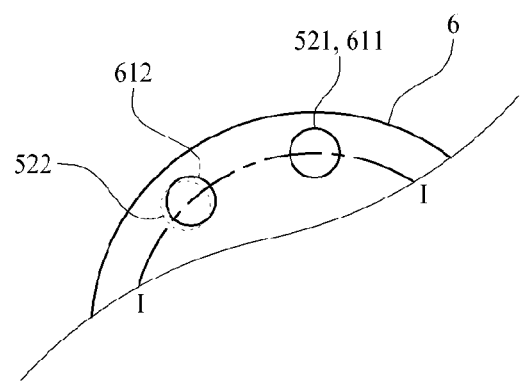
FIG. 8 is a schematic plan view showing a state before the position of an operation link part is adjusted in the clutch adjustment device for an agricultural work vehicle according to the present disclosure.
Figure 9:
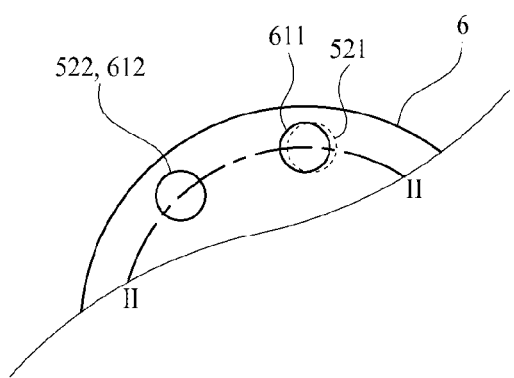
FIG. 9 is a schematic plan view showing a state after the position of the operation link part has been adjusted in the clutch adjustment device for an agricultural work vehicle according to the present disclosure.
Figure 10:
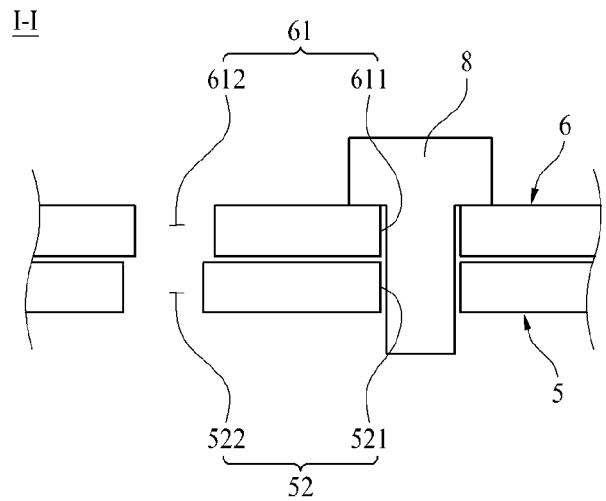
FIG. 10 is a schematic sectional view of the clutch link part and the operation link part taken along line I-I of FIG. 8.
Figure 11:
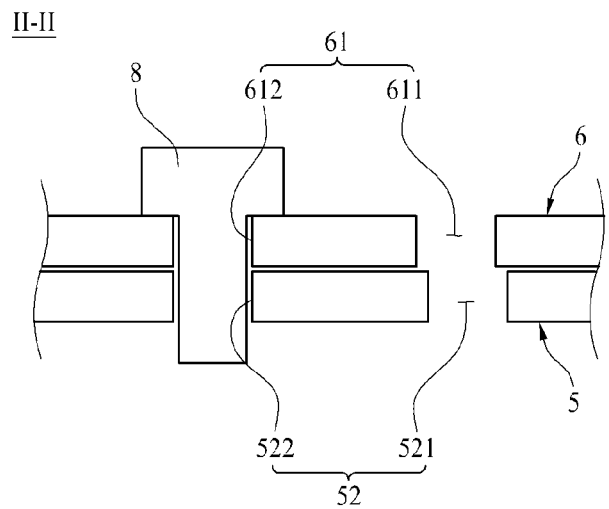
FIG. 11 is a schematic sectional view of the clutch link part and the operation link part taken along line II-II in FIG. 9.
Figure 12:
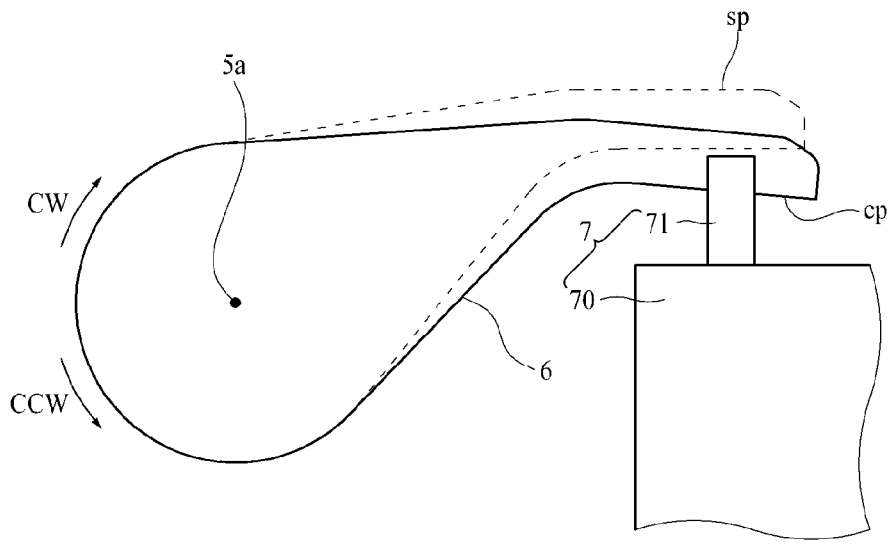
FIG. 12 is a schematic conceptual diagram showing a reference position and a changed position in the clutch adjustment device for agricultural work vehicles according to the present disclosure.
Figure 13:
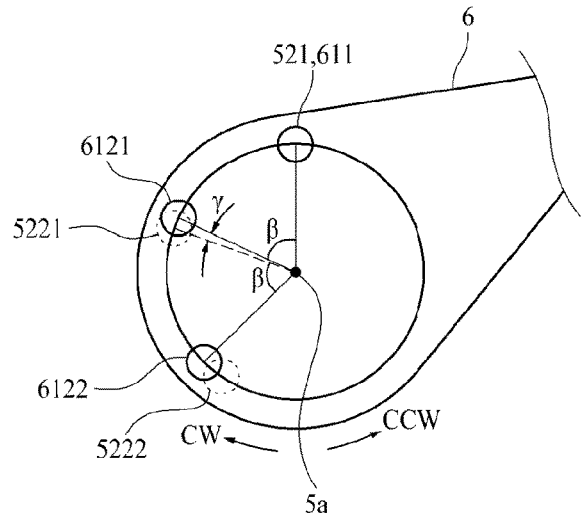
FIG. 13 is a conceptual diagram showing a modified embodiment of clutch adjustment holes in the clutch adjustment device for agricultural work vehicles according to the present disclosure.
Figure 14:
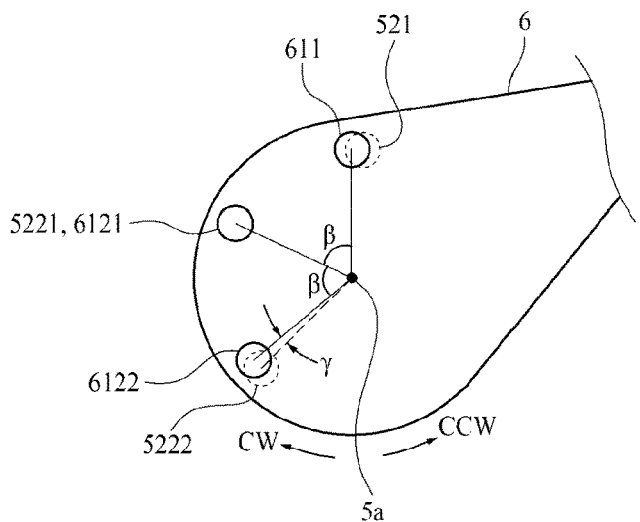
FIG. 14 is a conceptual diagram showing a modified embodiment of operation adjustment holes in the clutch adjustment device for agricultural work vehicles according to the present disclosure.
Figure 15:
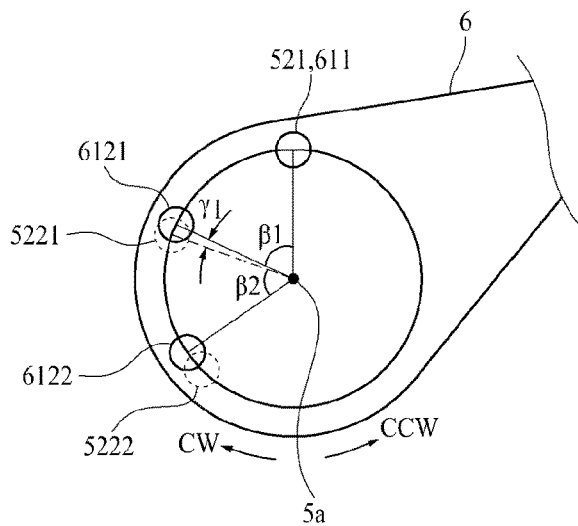
FIG. 15 is a schematic plan view showing a state before an operation link part according to an embodiment in which operation adjustment holes are arranged at equal intervals is adjusted in the clutch adjustment device for an agricultural work vehicle according to the present disclosure.
Figure 16:
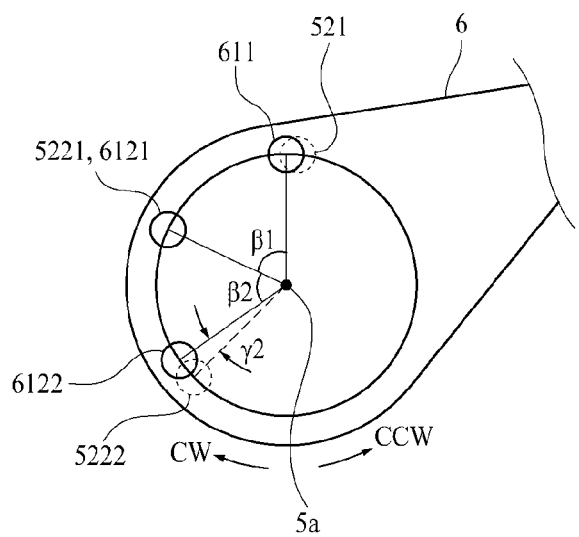
FIG. 16 is a schematic plan view showing a state after the operation link part according to an embodiment in which operation adjustment holes are arranged at equal intervals has been adjusted in the clutch adjustment device for an agricultural work vehicle according to the present disclosure.
Figure 17:
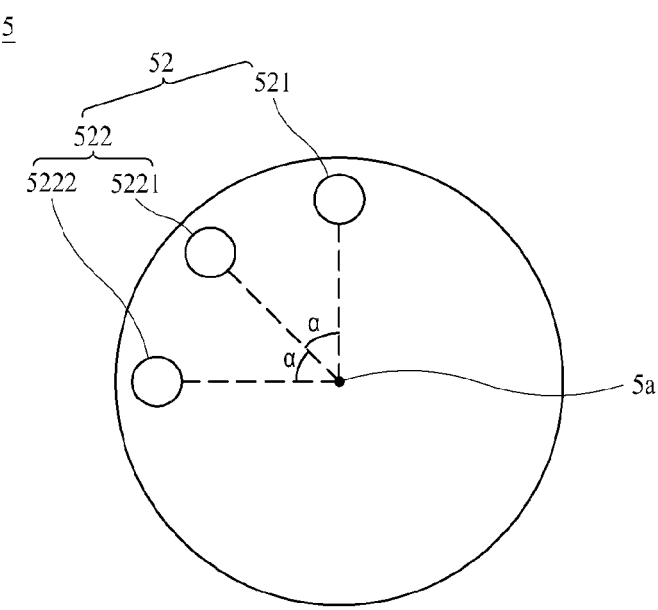
FIG. 17 is a schematic plan view showing a state before an operation link part according to an embodiment in which operation adjustment holes are arranged at unequal intervals is adjusted in the clutch adjustment device for an agricultural work vehicle according to the present disclosure.
Figure 18:
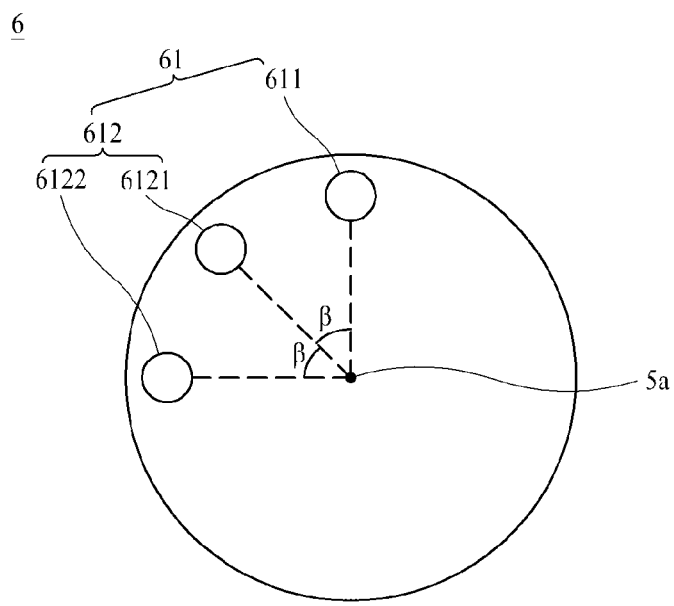
FIG. 18 is a schematic plan view showing a state after the operation link part according to the embodiment in which operation adjustment holes are arranged at unequal intervals have been adjusted in the clutch adjustment device for an agricultural work vehicle according to the present disclosure.

Referring to FIG. 5, the adjustment part 8 may couple or separate the operation link part 6 to or from the clutch link part 5. The adjustment part 8 may be coupled to penetrate the operation link part 6 and the clutch link part 5 and couple the operation link part 6 and the clutch link part 5 to each other. The adjustment part 8 may separate the operation link part 6 and the clutch link part 5 from each other by being separated from the operation link part 6 and the clutch link part 5. The adjustment part 8 may be formed of members that selectively separate and couple the operation link part 6 and the clutch link part 5 from and to each other. For example, the adjustment part 8 may be composed of a bolt and a nut.

Meanwhile, referring to FIGS. 2 to 5 and FIG. 12, in the clutch adjustment device 10 for an agricultural work vehicle according to the present disclosure, the operation link part 6 is initially located at a reference position sp. However, when excessive free play is generated in the clutch 31 as the driving time for the driving of the vehicle body 2 elapses, the operation link part 6 may rotate clockwise CW around the connecting shaft 5a and be moved to a changed position cp. In this case, the free play of the clutch 31 needs to be corrected by adjusting the length of the pressing mechanism 71, but a disassembly process for adjusting the length of the pressing mechanism 71 is complicated, thus making adjustment difficult. Furthermore, the range within which the length of the pressing mechanism 71 is adjusted is not large.

In some cases, the clutch 31 does not operate normally, resulting in a problem in which driving from the engine cannot be appropriately transmitted.

When the operation link part 6 is moved to the changed position cp as described above, it is necessary to move the operation link part 6 back to the reference position sp in order for the clutch 31 to operate normally. In this case, it is necessary to rotate the operation link part 6 counterclockwise CCW around the connection shaft 5a so that the operation link part 6 is disposed at the reference position sp.

In this case, the clutch adjustment device 10 for an agricultural work vehicle according to the present disclosure may be implemented to prevent the erroneous operation of the clutch 31. To this end, in the clutch adjustment device 10 for an agricultural work vehicle according to the present disclosure, the clutch link part 5 and the operation link part 6 may be implemented as follows.

Referring to FIGS. 4 to 6 and 12, the clutch link part 5 may include the clutch adjustment holes 52.

The clutch adjustment holes 52 are formed in the clutch link part 5. The clutch adjustment holes 52 may be formed to penetrate the clutch adjustment holes 52. The clutch adjustment holes 52 may be formed in the clutch link part 5 as a plurality of clutch adjustment holes 52. For example, the clutch adjustment holes 52 may be formed in the clutch link part 5 as two clutch adjustment holes 52. In this case, the clutch adjustment holes 52 may include a reference clutch adjustment hole 521 and a spaced clutch adjustment hole 522.

The reference clutch adjustment hole 521 may be formed on one side of the clutch link part 5. The spaced clutch adjustment hole 522 may be formed to be spaced apart from the reference clutch adjustment hole 521. The spaced clutch adjustment hole 522 may be arranged to be spaced apart from the reference clutch adjustment hole 521 along the circumferential direction of the connection shaft 5a. The spaced clutch adjustment hole 522 may be formed to be spaced apart from the reference clutch adjustment hole 521 along the counterclockwise (CCW) direction in which the clutch link part 5 rotates. In this case, the reference clutch adjustment hole 521 and the spaced clutch adjustment hole 522 may be arranged to be spaced apart from each other at a clutch center angle α around the connection shaft 5a.

Referring to FIGS. 4 to 7 and 12, the operation link part 6 may include the operation adjustment holes 61.

The operation adjustment holes 61 are formed in the operation link part 6. The operation adjustment holes 61 may be formed to penetrate the operation link part 6. The operation adjustment holes 61 may be formed in the operation link part 6 as a plurality of operation adjustment holes 61. For example, the adjustment holes 61 may be formed in the operation link part 6 as two operation adjustment holes 61. In this case, the operation adjustment holes 61 may include a reference operation adjustment hole 611 and a spaced operation adjustment hole 612.

The reference operation adjustment hole 611 may be formed on one side of the operation link part 6. The spaced operation adjustment hole 612 may be formed to be spaced apart from the reference operation adjustment hole 611. The spaced operation adjustment hole 612 may be arranged to be spaced apart from the reference operation adjustment hole 611 along the circumferential direction of the connection shaft 5a. The spaced operation adjustment hole 612 may be formed to be spaced apart from the reference operation adjustment hole 611 along the counterclockwise (CCW) direction in which the operation link part 6 rotates. In this case, the reference operation adjustment hole 611 and the spaced operation adjustment hole 612 may be arranged to be spaced apart from each other at an operation center angle β around the connection shaft 5a.

Referring to FIGS. 6 to 9, the clutch center angle α and the operation center angle β may be formed differently from each other. Accordingly, in the clutch adjustment device 10 for an agricultural work vehicle according to the present disclosure, when the clutch link part 5 and the operation link part 6 are coupled to each other so that the reference clutch adjustment hole 521 and the reference operation adjustment hole 611 overlap each other, the spaced clutch adjustment hole 522 and the spaced operation adjustment hole 612 may be arranged to be off-center from each other. Accordingly, in the clutch adjustment device 10 for an agricultural work vehicle according to the present disclosure, the clutch link part 5 and the operation link part 6 are coupled to each other so that the spaced clutch adjustment hole 522 and the spaced operation adjustment hole 612 overlap each other, thereby rotating the operation link part 6 by a predetermined angle. Therefore, the clutch adjustment device 10 for an agricultural work vehicle according to the present disclosure may correct the free play generated in the clutch 31 by adjusting the relative position of the operation link part 6 with respect to the clutch link part 5.

Referring to FIGS. 2 to 11, the adjustment part 8 may be selectively inserted into the reference clutch adjustment hole 521 and the reference operation adjustment hole 611 and into the spaced clutch adjustment hole 522 and the spaced operation adjustment hole 612. Accordingly, in the clutch adjustment device 10 for an agricultural work vehicle according to the present disclosure, the adjustment part 8 may be separated from the reference clutch adjustment hole 521 and the reference operation adjustment hole 611 and inserted into the spaced clutch adjustment hole 522 and the spaced operation adjustment hole 612. Therefore, the clutch adjusting device 10 for an agricultural work vehicle according to the present disclosure may be implemented such that the relative position of the operation link part 6 with respect to the clutch link part 5 is adjusted through the adjustment part 8. In this manner, the clutch adjustment device 10 for an agricultural work vehicle according to the present disclosure may relatively simply perform the operation of correcting the free play of the clutch 31 by separating or coupling the adjustment part 8 from or to the clutch link part 5 and the operation link part 6.

Referring to FIGS. 5 and 8 to 12, a method of adjusting the position of the operation link part 6 in the clutch adjustment device 10 for an agricultural work vehicle according to the present disclosure will be described.

First, in order to couple the clutch link part 5 and the operation link part 6, the reference clutch adjustment hole 521 and the reference operation adjustment hole 611 may be arranged to overlap each other. In this case, the adjustment part 8 may be coupled to the clutch link part 5 and the operation link part 6 to pass through the reference clutch adjustment hole 521 and the reference operation adjustment hole 611. Accordingly, in the clutch adjusting device 10 for an agricultural work vehicle according to the present disclosure, the clutch link part 5 and the operation link part 6 may be coupled to each other through the adjustment part 8. As described above, when the operation link part 6 is moved to the changed position cp as the driving time elapses, it is necessary to rotate the operation link part 6 counterclockwise CCW around the connection shaft 5a. To this end, the adjustment part 8 may be separated from the reference clutch adjustment hole 521 and the reference operation adjustment hole 611. Thereafter, the clutch link part 5 and the operation link part 6 may be arranged such that the operation link part 6 rotates counterclockwise CCW around the connection shaft 5a, so that the spaced clutch adjustment hole 522 and the spaced operation adjustment hole 612 overlap each other. In this case, the adjustment part 8 may be coupled to the clutch link part 5 and the operation link part 6 to pass through the spaced clutch adjustment hole 522 and the spaced operation adjustment hole 612. Accordingly, in the clutch adjustment device 10 for an agricultural work vehicle according to the present disclosure, an implementation may be made such that the operation link part 6 is moved from the changed position cp to the reference position sp. Therefore, the clutch adjustment device 10 for an agricultural work vehicle according to the present disclosure may correct the free play of the clutch 31 by adjusting the position of the operation link part 6 through the clutch adjustment hole 52 and the operation adjustment hole 61.

Meanwhile, when excessive free play is generated in the clutch 31 and the operation link part 6 is moved to the changed position cp, the position of the pressing mechanism 71 may be moved by adjusting the operation part 7. When the pressing mechanism 71 is moved upward, the operation link part 6 may be moved to the reference position sp by being rotated counterclockwise CCW around the connection shaft 5a for the pressing mechanism 71. However, the method of adjusting the operation part 7 has a problem in which it is difficult to perform fine tuning and causes inconvenience in which it is necessary to disassemble the operation part 7 in order to adjust the operation part 7. In contrast, the method of adjusting the operation link part 6 through the clutch adjustment holes 52 and the operation adjustment holes 61 has the advantage of allowing fine adjustment.

Referring to FIGS. 2 to 5 and 12 to 16, modified embodiments of the clutch adjustment holes 52 and the operation adjustment holes 61 will be described.

The spaced clutch adjustment holes 522 may include a first spaced clutch adjustment hole 5221 and a second spaced clutch adjustment hole 5222. The first spaced clutch adjustment hole 5221 is formed to be spaced apart from the reference clutch adjustment hole 521 along the rotation direction of the clutch link part 5. The second spaced clutch adjustment hole 5222 is formed from the first spaced clutch adjustment hole 5221 along the rotation direction of the clutch link part 5. The first spaced clutch adjustment hole 5221 and the second spaced clutch adjustment hole 5222 may be arranged along the circumferential direction of the connection shaft 5a. Accordingly, the reference clutch adjustment hole 521, the first spaced clutch adjustment hole 5221, and the second spaced clutch adjustment hole 5222 may be arranged along the circumferential direction. In this case, the reference clutch adjustment hole 521, the first distance clutch adjustment hole 5221, and the second distance clutch adjustment hole 5222 may be spaced from each other at the clutch center angle α around the connection shaft 5a, and may thus be arranged at equal intervals.

The spaced operation adjustment holes 612 may include a first spaced operation adjustment hole 6121 and a second spaced operation adjustment hole 6122. The first spaced operation adjustment hole 6121 is formed to be spaced apart from the reference operation adjustment hole 611 along the rotation direction of the operation link part 6. The second spaced operation adjustment hole 6122 is formed from the first spaced operation adjustment hole 6121 along the rotation direction of the operation link part 6. The first spaced operation adjustment hole 6121 and the second spaced operation adjustment hole 6122 may be arranged along the circumferential direction of the connection shaft 5a. Accordingly, the reference operation adjustment hole 611, the first spaced operation adjustment hole 6121, and the second spaced operation adjustment hole 6122 may be arranged along the circumferential direction. The reference operation adjustment hole 611, the first spaced operation adjustment hole 6121, and the second spaced operation adjustment hole 6122 may be spaced apart from each other at the operation center angle β around the connection shaft 5a, and may thus be arranged at equal intervals.

Referring to FIGS. 4, 5, and 13 to 16, the clutch center angle α and the operation center angle β may be formed differently from each other. Accordingly, the clutch adjustment device 10 for an agricultural work vehicle according to the present disclosure may be implemented such that, when the clutch link part 5 and the operation link part 6 are coupled to each other so that the reference clutch adjustment hole 521 and the reference operation adjustment hole 611 overlap each other, the spaced clutch adjustment hole 522 and the spaced operation adjustment holes 612 are arranged to be off-center from each other. Accordingly, the clutch adjustment device 10 for an agricultural work vehicle according to the present disclosure may couple the clutch link part 5 and the operation link part 6 so that one of the spaced clutch adjustment holes 522 and one of the spaced operation adjustment holes 612 overlap each other, thereby rotating the operation link part 6 by a predetermined angle. Therefore, the clutch adjustment device 10 for an agricultural work vehicle according to the present disclosure may correct the free play, generated in the clutch 31, by adjusting the relative position of the operation link part 6 with respect to the clutch link part 5.

Referring to FIGS. 2 to 5, 13, and 14, the adjustment part 8 may be selectively inserted into the reference clutch adjustment hole 521 and the reference operation adjustment hole 611, into the first spaced clutch adjustment hole 5221 and the first spaced operation adjustment hole 6121, and into the second spaced clutch adjustment hole 5222 and the second spaced operation adjustment hole 6122. Accordingly, the clutch adjusting device 10 for an agricultural work vehicle according to the present disclosure may be implemented such that the relative position of the operation link part 6 with respect to the clutch link part 5 can be adjusted multiple times through the adjustment part 8. In this manner, the clutch adjusting device 10 for an agricultural work vehicle according to the present disclosure may relatively simply perform the operation of correcting the free play of the clutch 31 by separating or coupling the adjustment part 8 from or to the clutch link part 5 and the operation link part 6.

Referring to FIGS. 4, 12, 15, and 16, in the clutch adjustment device 10 for an agricultural work vehicle according to the present disclosure, the operation link part 6 according to the embodiment in which the operation adjustment holes 61 are arranged at equal intervals out of the modified embodiments may be adjusted as follows.

Before the clutch adjustment device 10 for the agricultural work vehicle according to the present disclosure is adjusted, the clutch link part 5 and the operation link part 6 may be coupled to each other so that the reference clutch adjustment hole 521 and the reference operation adjustment hole 611 overlap each other. In this case, the adjustment part 8 may be coupled into the reference clutch adjustment hole 521 and the reference operation adjustment hole 611. As described above, as the usage time of the clutch 31 elapses, the operation link part 6 may be moved from the reference position sp to the changed position cp. In this case, in order to adjust the position of the operation link part 6, the adjustment part 8 coupled into the reference clutch adjustment hole 521 and the reference operation adjustment hole 611 may be separated. Thereafter, the first spaced clutch adjustment hole 5221 and the first spaced operation adjustment hole 6121 may be arranged to overlap each other by rotating the operation link part 6 counterclockwise CCW. In this case, the reference clutch adjustment hole and the reference operation adjustment hole 611 may be arranged to be spaced apart at an adjustment angle γ around the connection shaft 5a. The operation link part 6 is rotated counterclockwise CCW by the adjustment angle γ around the connection shaft 5a, thereby allowing the first spaced clutch adjustment hole 5221 and the first spaced operation adjustment holes 6121 to be arranged to overlap each other. After the first spaced clutch adjustment hole 5221 and the first spaced operation adjustment hole 6121 have been arranged to overlap each other, the adjustment part 8 may be coupled to each of the first spaced clutch adjustment hole 5221 and the first spaced operation adjustment hole 6121. Accordingly, in the clutch adjustment device 10 for an agricultural work vehicle according to the present disclosure, the operation link part 6 may be rotated counterclockwise CCW by the adjustment angle. Therefore, the clutch adjustment device 10 for an agricultural work vehicle according to the present disclosure may be implemented to adjust the relative position of the operation link part 6 with respect to the clutch link part 5 through the first spaced clutch adjustment hole 5221 and the first spaced operation adjustment hole 6121, thereby rearranging the operation link part 6 at the reference position sp. Thereafter, the clutch link part 5 and the operation link part 6 may be coupled by the adjustment part 8 coupled into the first spaced clutch adjustment hole 5221 and the first spaced operation adjustment hole 6121, thereby entering a state in which the power from the engine can be transmitted. The clutch adjustment device 10 for an agricultural work vehicle according to the present disclosure may be implemented such that the clutch 31 operates normally through the above adjustment operation.

Even when the operation link part 6 is moved to the reference position sp and the clutch 31 operates normally, excessive free play may be generated again in the clutch 31 as the usage time of the clutch 31 elapses. In this case, the clutch adjustment device 10 for an agricultural work vehicle according to the present disclosure may move the position of the operation link part 6 through the second spaced clutch adjustment hole 5222 and the second spaced operation adjustment hole 6122.

When the operation link part 6 is adjusted once, the clutch link part 5 and the operation link part 6 may be coupled to each other so that the first spaced clutch adjustment hole 5221 and the first spaced operation adjustment hole 6121 overlap each other. The adjustment part 8 may be coupled into the first spaced clutch adjustment hole 5221 and the first spaced operation adjustment hole 6121. As described above, as the usage time of the clutch 31 elapses, the operation link part 6 may be moved from the reference position sp to the changed position cp. In this case, in order to adjust the position of the operation link part 6, the adjustment part 8 coupled into the first spaced clutch adjustment hole 5221 and the first spaced operation adjustment hole 6121 may be separated. Thereafter, the second spaced clutch adjustment hole 5222 and the second spaced operation adjustment hole 6122 may be arranged to overlap each other by rotating the operation link part 6 counterclockwise CCW. In this case, the first spaced clutch adjustment hole 5221 and the first spaced operation adjustment hole 6121 may be arranged to be spaced apart from each other at the adjustment angle γ around the connection shaft 5a. Accordingly, the operation link part 6 is rotated counterclockwise CCW by the adjustment angle γ around the connecting shaft 5a, so that the second spaced clutch adjustment hole 5222 and the second spaced operation adjustment hole 6122 may be arranged to overlap each other. After the second spaced clutch adjustment hole 5222 and the second spaced operation adjustment hole 6122 have been arranged to overlap each other, the adjustment part 8 may be coupled to each of the second spaced clutch adjustment hole 5222 and the second spaced operation adjustment hole 6122. Accordingly, the clutch adjustment device 10 for an agricultural work vehicle according to the present disclosure may move the position of the operation link part 6 through the second spaced clutch adjustment hole 5222 and the second spaced operation adjustment hole 6122 again even when the operation link part 6 is moved back to the changed position cp. As described above, the clutch adjustment device 10 for an agricultural work vehicle according to the present disclosure may be implemented to adjust the operation link part 6 to the reference position sp multiple times through the first spaced operation adjustment hole 6121 and the second spaced operation adjustment hole 6122.

Referring to FIGS. 4, 12, 17, and 18, in the clutch adjustment device 10 for an agricultural work vehicle according to the present disclosure, the operation link part 6 according to the embodiment in which the operation adjustment holes 61 are arranged at unequal intervals out of the modified embodiments may be adjusted as follows.

In the clutch adjustment device 10 for an agricultural work vehicle according to the present disclosure, the operation adjustment holes 61 may be arranged to be spaced apart at unequal intervals around the connection shaft 5a. In this case, the reference operation adjustment hole 611 and the first spaced operation adjustment hole 6121 may be arranged to be spaced apart from each other at a first operation center angle β1 around the connection shaft 5a, and the first spaced operation adjustment hole 6121 and the second spaced operation adjustment hole 6122 may be arranged to be spaced apart from each other at a second operation center angle β2 around the connection shaft 5a. Meanwhile, the reference clutch adjustment hole 521, the first distance clutch adjustment hole 5221, and the second distance clutch adjustment hole 5222 may be arranged at equal intervals to be spaced apart from each other at the clutch center angle α around the connection shaft 5a. Before the clutch adjustment device 10 for an agricultural work vehicle according to the present disclosure has been adjusted, the clutch link part 5 and the operation link part 6 may be coupled to each other so that the reference clutch adjustment hole 521 and the spaced clutch adjustment hole 522 overlap each other. In this case, the adjustment part 8 may be coupled to the reference clutch adjustment hole 521 and the reference operation adjustment hole 611. As described above, the operation link part 6 may be moved from the reference position sp to the changed position cp. In this case, in order to adjust the position of the operation link part 6, the adjustment part 8 to be coupled into the reference clutch adjustment hole 521 and the reference operation adjustment hole 611 may be separated. Thereafter, the first spaced clutch adjustment hole 5221 and the reference operation adjustment hole 611 may be arranged to overlap each other by rotating the operation link part 6 counterclockwise CCW. In this case, the reference clutch adjustment hole 521 and the reference operation adjustment hole 611 may be arranged to be spaced apart from each other at a first adjustment angle γ1 around the connection shaft 5a. The operation link part 6 may be rotated counterclockwise CCW by the first adjustment angle γ1 around the connection shaft 5a, so that the first spaced clutch adjustment hole 5221 and the first spaced operation adjustment hole 6121 can be arranged to overlap each other. After the first spaced clutch adjustment hole 5221 and the first spaced operation adjustment hole 6121 have been arranged to overlap each other, the adjustment part 8 may be coupled into each of the first spaced clutch adjustment hole 5221 and the first spaced operation adjustment hole 6121. Accordingly, in the clutch adjustment device 10 for an agricultural work vehicle according to the present disclosure, the operation link part 6 may be rotated counterclockwise CCW by the first adjustment angle γ1. The clutch link part 5 and the operation link part 6 may be coupled by the adjustment part 8 coupled into the first spaced clutch adjustment hole 5221 and the first spaced operation adjustment hole 6121, thereby entering a state in which power from the engine can be transmitted. Even when the operation link part 6 is moved to the reference position sp and the clutch 31 operates normally, excessive free play may be generated again in the clutch 31 as the usage time of the clutch 31 elapses. In this case, the clutch adjustment device 10 for an agricultural work vehicle according to the present disclosure may move the position of the operation link part 6 through the second spaced clutch adjustment hole 5222 and the second spaced operation adjustment hole 6122.

When the operation link part 6 is adjusted once, the clutch link part 5 and the operation link part 6 may be coupled to each other so that the first spaced clutch adjustment hole 5221 and the first spaced operation adjustment hole 6121 overlap each other. The adjustment part 8 may be coupled into the first spaced clutch adjustment hole 5221 and the first spaced operation adjustment hole 6121. As described above, as the usage time of the clutch 31 elapses, the operation link part 6 may be moved from the reference position sp to the changed position cp. In this case, in order to adjust the position of the operation link part 6, the adjustment part 8 coupled into the first spaced clutch adjustment hole 5221 and the first spaced operation adjustment hole 6121 may be separated. Thereafter, the second spaced clutch adjustment hole 5222 and the second spaced operation adjusting hole 6122 may be arranged to overlap each other by rotating the operation link part 6 counterclockwise CCW. In this case, the first spaced clutch adjustment hole 5221 and the first spaced operation adjustment hole 6121 may be arranged to be spaced apart from each other at the second adjustment angle γ2 around the connection shaft 5a. Accordingly, the operation link part 6 may be rotated counterclockwise CCW by the second adjustment angle γ2 around the connecting shaft 5a, so that the second spaced clutch adjustment hole 5222 and the second spaced operation adjustment hole 6122 can be arranged to overlap each other. After the second spaced clutch adjustment hole 5222 and the second spaced operation adjustment hole 6122 have been arranged to overlap each other, the adjustment part 8 may be coupled into each of the second spaced clutch adjustment hole 5222 and the second spaced operation adjustment hole 6122. Accordingly, the clutch adjustment device 10 for an agricultural work vehicle according to the present disclosure may be implemented such that, when the operation adjustment holes 61 are arranged at unequal intervals, the operation link part 6 is rotated by different adjustment angles γ.

Referring to FIGS. 2 to 5, 19 and 20, another modified embodiment of the operation link part 6 in the clutch adjustment device 10 for an agricultural work vehicle according to the present disclosure will be described.

Figure 19:
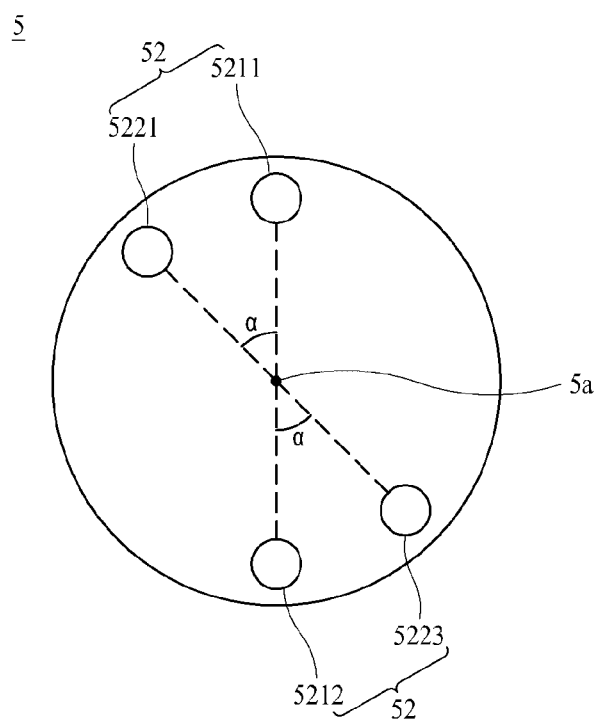
FIG. 19 is a conceptual diagram showing another modified embodiment of the clutch adjustment holes in the clutch adjustment device for agricultural work vehicles according to the present disclosure.

The clutch adjustment hole 521 may be formed as a plurality of reference clutch adjustment holes 521, and the reference clutch adjustment holes 521 may be arranged at equal intervals along the rotation direction of the clutch link part 5. The spaced clutch adjustment hole 522 may be formed as a plurality of spaced clutch adjustment holes 522, and the spaced clutch adjustment holes 522 may be arranged to be spaced apart from the respective reference clutch adjustment holes 521. For example, as shown in FIG. 19, the reference clutch adjustment holes 521 may include a first reference clutch adjustment hole 5211 and a second reference clutch adjustment hole 5212. In this case, the spaced clutch adjustment holes 522 may include the first spaced clutch adjustment hole 5221 spaced apart from the first reference clutch adjustment hole 5211 and the third spaced clutch adjustment hole 5223 spaced apart from the second reference clutch adjustment hole 5212. The first reference clutch adjustment hole 5211 and the first spaced clutch adjustment hole 5221 may be arranged to be spaced apart from each other at the clutch center angle $\alpha$ around the connection shaft 5a. The second reference clutch adjustment hole 5212 and the third spaced clutch adjustment hole 5223 may be arranged to be spaced apart from each other at the clutch center angle $\alpha$ around the connection shaft 5a.

Figure 20:
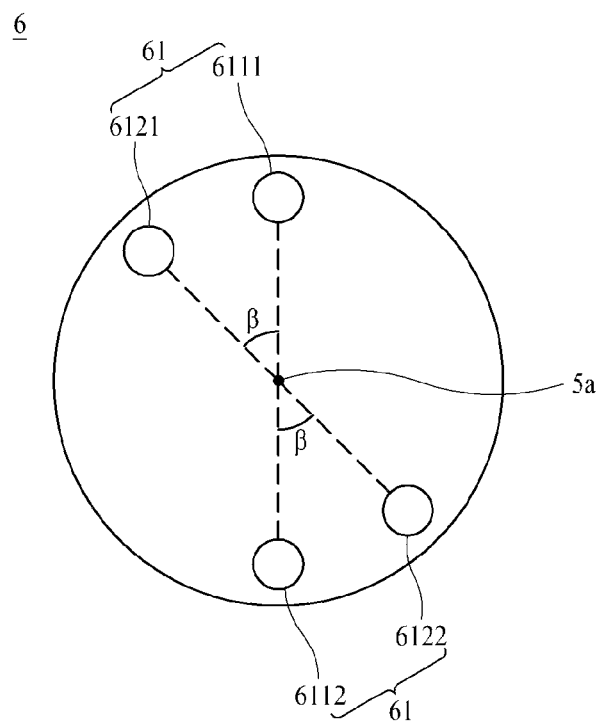
FIG. 20 is a conceptual diagram showing another modified embodiment of the operation adjustment holes in the clutch adjustment device for agricultural work vehicles according to the present disclosure.
Figure 21:
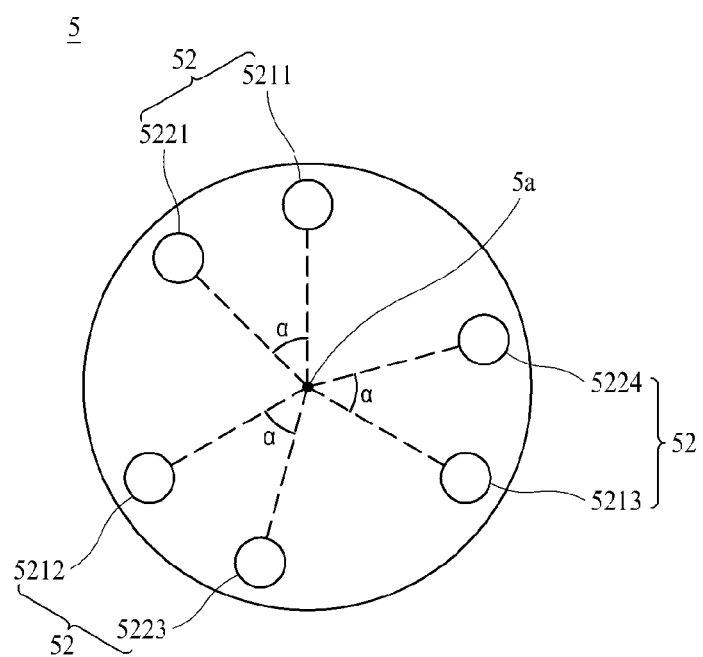
FIG. 21 is a conceptual diagram showing another modified embodiment of the clutch adjustment holes in the clutch adjustment device for agricultural work vehicles according to the present disclosure.
Figure 22:
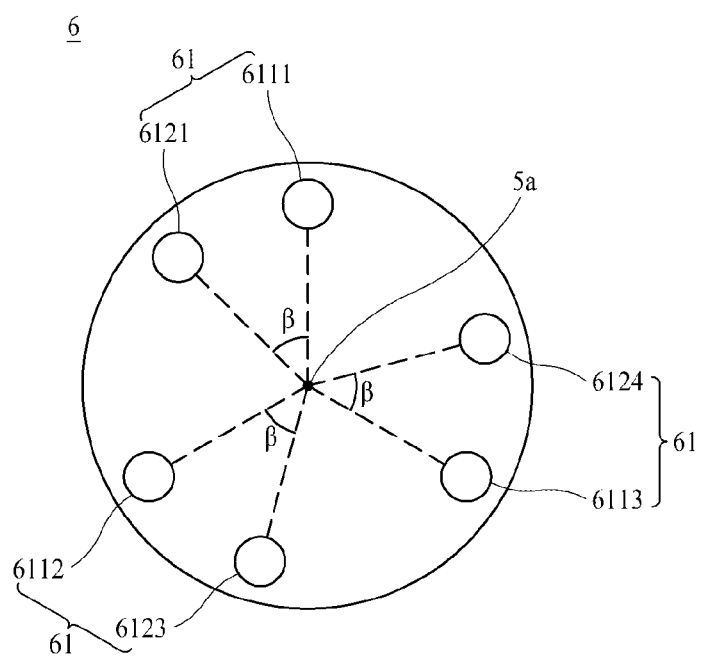
FIG. 22 is a conceptual diagram showing another modified embodiment of the operation adjustment holes in the clutch adjustment device for agricultural work vehicles according to the present disclosure.

The reference operation adjustment hole 611 may be formed as a plurality of reference operation adjustment holes 611, and the reference operation adjustment holes 611 may be arranged at equal intervals along the rotation direction of the operation link part 6. The spaced operation adjustment hole 612 may be formed as a plurality of spaced operation adjustment holes 612, and the spaced operation adjustment holes 612 may be arranged to be spaced apart from the respective reference operation adjustment holes 611. For example, as shown in FIG. 20, the operation adjustment holes 61 may include the first reference operation adjustment hole 6111 and the second reference operation adjustment hole 6112. In this case, the operation adjustment holes 61 may include the first spaced operation adjustment hole 6121 spaced apart from the first reference operation adjustment hole 6111 and the third spaced operation adjustment hole 6123 spaced apart from the second reference operation adjustment hole 6112. The first reference operation adjustment hole 6111 and the first spaced operation adjustment hole 6121 may be arranged to be spaced apart from each other at the operation center angle $\beta$ around the connection shaft 5a. The second reference operation adjustment hole 6112 and the third spaced operation adjustment hole 6123 may be arranged to be spaced apart from each other at the operation center angle $\beta$ around the connection shaft 5a. In this case, the adjustment part 8 may include a first adjustment part 81 and a second adjustment part 82. Although the adjustment part 8 is shown as being composed of three parts in FIG. 5, the present disclosure is not limited thereto. The adjustment part 8 may be configured to correspond to the numbers of the reference clutch adjustment holes 521 and the spaced operation adjustment holes 612.

Referring to FIGS. 2 to 5, 21 and 22, another modified embodiment of the operation link part 6 in the clutch adjustment device 10 for an agricultural work vehicle according to the present disclosure will be described.

Referring to FIGS. 2 to 5, 21 and 22, the clutch adjustment holes 52 may include reference clutch adjustment holes 521.

The reference clutch adjustment holes 521 may include a first reference clutch adjustment hole 5211, a second reference clutch adjustment hole 5212, and a third reference clutch adjustment hole 5213. In this case, the clutch adjustment hole 52 may include a first spaced clutch adjustment hole 5221 arranged to be spaced apart from the first reference clutch adjustment hole 5211, a third spaced clutch adjustment hole 5223 arranged to be spaced apart from the second reference clutch adjustment hole 5212, and a fourth spaced clutch adjustment hole 5224 arranged to be spaced apart from the third reference clutch adjustment hole 5213. The first reference clutch adjustment hole 5211 and the first spaced clutch adjustment hole 5221 may be arranged to be spaced apart from each other at the clutch center angle $\alpha$ around the connection shaft 5a. The second reference clutch adjustment hole 5212 and the third spaced clutch adjustment hole 5223 may be arranged to be spaced apart from each other at the clutch center angle $\alpha$ around the connection shaft 5a. The third reference clutch adjustment hole 5213 and the fourth spaced clutch adjustment hole 5224 may be arranged to be spaced apart from each other at the clutch center angle $\alpha$ around the connection shaft 5a.

Referring to FIGS. 2 to 5, 21 and 22, the operation adjustment holes 61 may include reference operation adjustment holes 611.

The reference operation adjustment holes 611 may include a first reference operation adjustment hole 6111, a second reference operation adjustment hole 6112, and a third reference operation adjustment hole 6113. In this case, the spaced operation adjustment holes 612 may include a first spaced operation adjustment hole 6121 spaced apart from the first reference operation adjustment hole 6111, a third spaced operation adjustment hole 6123 spaced apart from the second reference operation adjustment hole 6112, and a fourth remote operation adjustment hole 6124 spaced apart from the third reference operation adjustment hole 6113. The first reference operation adjustment hole 6111 and the first spaced operation adjustment hole 6121 may be arranged to be spaced apart from each other at the operation center angle $\beta$ around the connection shaft 5a. The second reference operation adjustment hole 6112 and the third spaced operation adjustment hole 6123 may be arranged to be spaced apart from each other at the operation center angle $\beta$ around the connection shaft 5a. The third reference operation adjustment hole 6113 and the fourth spaced operation adjustment hole 6124 may be arranged to be spaced apart from each other at the operation center angle $\beta$ around the connection shaft 5a. In this case, the adjustment part 8 may include a first adjustment part 81, a second adjustment part 82, and a third adjustment part (not shown). The adjustment parts 8 may be implemented as four or more parts to correspond to the numbers of the reference clutch adjustment holes 521 and the spaced operation adjustment holes 612.

Referring to FIGS. 2 to 5 and 19 to 22, the clutch center angle $\alpha$ and the operation center angle $\beta$ may be formed differently from each other. Accordingly, in the clutch adjustment device 10 for an agricultural work vehicle according to the present disclosure, when the clutch link part 5 and the operation link part 6 are coupled to each other so that the reference clutch adjustment holes 521 and the reference operation adjustment holes 611 overlap each other, the spaced clutch adjustment holes 522 and the spaced operation adjustment holes 612 may be arranged to be off-center from each other. Accordingly, in the clutch adjustment device 10 for an agricultural work vehicle according to the present disclosure, the clutch link part 5 and the operation link part 6 are coupled to each other so that one of the spaced clutch adjustment holes 522 and one of the spaced operation adjustment holes 612 overlap each other, thereby rotating the operation link part 6 by a predetermined angle. Therefore, the clutch adjustment device 10 for an agricultural work vehicle according to the present disclosure may adjust the relative position of the operation link part 6 with respect to the clutch link part 5, thereby preventing the erroneous operation of the clutch 31 resulting from the excess free play generated in the clutch 31.

Referring to FIGS. 2 to 5 and 19 to 22, the adjustment part 8 may be provided as a plurality of adjustment parts 8, and the adjustment parts 8 may be selectively inserted into the reference clutch adjustment holes 521 and the reference operation adjustment holes 611 and into the spaced clutch adjustment holes 522 and the spaced operation adjustment holes 612. Therefore, the clutch adjustment device 10 for an agricultural work vehicle according to the present disclosure may be implemented such that the relative position of the operation link part 6 with respect to the clutch link part 5 is adjusted through the adjustment parts 8. As described above, the clutch adjustment device 10 for an agricultural work vehicle according to the present disclosure may separate or couple the adjustment parts 8 from or to the clutch link part 5 and the operation link part 6, thereby relatively simply performing the operation of adjusting the free play of the clutch 31.

Referring to FIGS. 2 to 5 and 19 to 22, the adjustment parts 8 may be arranged to be spaced apart from each other at equal intervals along the circumferential direction of the connection shaft 5a. For example, when the adjustment parts 8 include the first adjustment part 81 and the second adjustment part 82, the first adjustment part 81 and the second adjustment part 82 may be arranged to be spaced apart from each other by 180° based on the connection shaft 5a. When the adjustment parts 8 include the first adjustment part 81, the second adjustment part 82, and the third adjustment part 83, the first adjustment part 81, the second adjustment part 82, and the third adjustment part 83 may be arranged to be spaced apart from each other by 120° based on the connection shaft 5a. Accordingly, in the clutch adjustment device 10 for an agricultural work vehicle according to the present disclosure, the adjustment parts 8 may be arranged to be rotationally symmetrical around the connection shaft 5a. Therefore, in the clutch adjustment device 10 for an agricultural work vehicle according to the present disclosure, the clutch link part 5 and the operation link part 6 may be more securely coupled to each other through the adjustment parts 8.

The present disclosure described above is not limited to the above-described embodiments and the accompanying drawings. It will be apparent to a person having ordinary skill in the art to which the present disclosure pertains that various substitutions, modifications, and alterations may be made without departing from the technical spirit of the present disclosure.

The invention claimed is:

1. A clutch adjustment device for an agricultural work vehicle, the clutch adjustment device comprising:
    a clutch configured to selectively connect and disconnect power transmission of an engine and transmission of an agricultural work vehicle;
    a clutch link part connected to the clutch, and configured to manipulate engagement and disengagement of the clutch and rotate around a connection shaft during engagement and disengagement of the clutch;
    an operation link part coupled to the clutch link part to rotate together with the clutch link part around the connection shaft; and
    an adjustment part configured to detachably couple the operation link part to the clutch link part so that a relative position of the operation link part with respect to the clutch link part can be adjusted around the connection shaft;
    wherein the clutch link part includes a plurality of clutch adjustment holes arranged to be spaced apart from each other;
    wherein the operation link part includes a plurality of operation adjustment holes arranged to be spaced apart from each other; and
    wherein the adjustment part is inserted into one of the clutch adjustment holes and one of the operation adjustment holes and adjusts a relative position of the operation link part with respect to the clutch link part around the connection shaft.

2. The clutch adjustment device of claim 1, wherein:
    the clutch adjustment holes include a reference clutch adjustment hole formed on one side of the clutch link part, and a spaced clutch adjustment hole formed to be spaced apart from the reference clutch adjustment hole along a direction in which the clutch link part rotates; and
    the operation adjustment holes include a reference operation adjustment hole formed on one side of the operation link part, and a spaced operation adjustment hole formed to be spaced apart from the reference operation adjustment hole along a direction in which the operation link part rotates.

3. The clutch adjustment device of claim 2, wherein:
    the reference clutch adjustment hole and the spaced clutch adjustment hole are arranged to be spaced apart from each other at a clutch center angle around the connection shaft;
    the reference operation adjustment hole and the spaced operation adjustment hole are arranged to be spaced apart from each other at an operation center angle around the connection shaft; and
    the clutch center angle and the operation center angle are different from each other.

4. The clutch adjustment device of claim 3, wherein the adjustment part is selectively inserted into the reference clutch adjustment hole and the reference operation adjustment hole and into the spaced clutch adjustment hole and the spaced operation adjustment hole.

5. The clutch adjustment device of claim 2, wherein:
    the spaced clutch adjustment hole includes a first spaced clutch adjustment hole formed to be spaced apart from the reference clutch adjustment hole along the direction in which the clutch link part rotates, and a second spaced clutch adjustment hole formed to be spaced apart from the first spaced clutch adjustment hole along the direction in which the clutch link part rotates; and
    the spaced operation adjustment hole includes a first spaced operation adjustment hole formed to be spaced apart from the reference operation adjustment hole along the direction in which the operation link part rotates, and a second spaced operation adjustment hole formed to be spaced apart from the first spaced operation adjustment hole along the direction in which the operation link part rotates.

6. The clutch adjustment device of claim 5, wherein:
    the reference clutch adjustment hole, the first spaced clutch adjustment hole, and the second spaced clutch adjustment hole are spaced apart from each other at a clutch center angle around the connection shaft and arranged at equal intervals from each other;
    the reference operation adjustment hole, the first spaced operation adjustment hole, and the second spaced operation adjustment hole are spaced apart from each other at an operation center angle around the connection shaft and arranged at equal intervals from each other; and the clutch center angle and the operation center angle are different from each other.

7. The clutch adjustment device of claim 6, wherein the adjustment part is selectively inserted into the reference clutch adjustment hole and the reference operation adjustment hole, into the first spaced clutch adjustment hole and the first spaced operation adjustment hole, and into the second spaced clutch adjustment hole and the second spaced operation adjustment hole.

8. The clutch adjustment device of claim 2, wherein:

the reference clutch adjustment hole is formed as a plurality of reference clutch adjustment holes and the reference clutch adjustment holes are arranged at equal intervals along the rotation direction of the clutch link part;

the spaced clutch adjustment hole is formed as a plurality of spaced clutch adjustment holes and the spaced clutch adjustment holes are arranged to be spaced apart from the respective reference clutch adjustment holes;

the reference operation adjustment hole is formed as a plurality of reference operation adjustment holes and the reference operation adjustment holes are arranged at equal intervals along the rotation direction of the operation link part; and the spaced operation adjustment hole is formed as a plurality of spaced operation adjustment holes and the spaced operation adjustment holes are arranged to be spaced apart from the respective reference operation adjustment holes.

9. The clutch adjustment device of claim 8, wherein:

each of the reference clutch adjustment holes and the spaced clutch adjustment holes are arranged to be spaced apart from each other at a clutch center angle around the connection shaft;

each of the reference operation adjustment holes and the spaced operation adjustment holes are arranged to be spaced apart at an operation center angle around the connection shaft; and the clutch center angle and the operation center angle are different from each other.

10. The clutch adjustment device of claim 9, wherein the adjustment part is provided as a plurality of adjustment parts and the adjustment parts are selectively inserted into the reference clutch adjustment holes and the reference operation adjustment holes and into the spaced clutch adjustment holes and the spaced operation adjustment holes.

11. The clutch adjustment device of claim 1, further comprising an operation part configured to rotate the operation link part to rotate the clutch link part around the connection shaft.

* * * * *